(12) United States Patent
Grampe et al.

(10) Patent No.: US 10,548,784 B2
(45) Date of Patent: Feb. 4, 2020

(54) CRASHWORTHY WHEELCHAIR ASSEMBLIES

(71) Applicant: Sikorsky Aircraft Corporation, Stratford, CT (US)

(72) Inventors: Tony Grampe, Wavell Heights (AU); Matthew Davies, Queensland (AU)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 96 days.

(21) Appl. No.: 15/737,116

(22) PCT Filed: Jun. 16, 2016

(86) PCT No.: PCT/US2016/037808
§ 371 (c)(1),
(2) Date: Dec. 15, 2017

(87) PCT Pub. No.: WO2016/205472
PCT Pub. Date: Dec. 22, 2016

(65) Prior Publication Data
US 2018/0153748 A1    Jun. 7, 2018

Related U.S. Application Data

(60) Provisional application No. 62/182,248, filed on Jun. 19, 2015.

(51) Int. Cl.
*A61G 3/08* (2006.01)
*A61G 5/10* (2006.01)
*B64D 11/06* (2006.01)

(52) U.S. Cl.
CPC ......... *A61G 3/0808* (2013.01); *A61G 5/1081* (2016.11); *B64D 11/0696* (2013.01); *A61G 2220/10* (2013.01)

(58) Field of Classification Search
CPC ........ A61G 3/0808; A61G 3/08; A61G 3/006; A61G 3/062; A61G 2203/723;
(Continued)

(56) References Cited

U.S. PATENT DOCUMENTS 3,865,427 A * 2/1975 Delany ................... A61G 3/06
                                                            280/30
4,455,046 A    6/1984 Linderoth
(Continued)

FOREIGN PATENT DOCUMENTS

FR        2880798 A1    7/2006

OTHER PUBLICATIONS

Partial European Search Report for European Application No. 16812409.7; International Filing Date Jun. 16, 2016; Report dated Jan. 14, 2019 (pp. 1-12).

(Continued)

*Primary Examiner* — D Glenn Dayoan
*Assistant Examiner* — Sunsurraye Westbrook
(74) *Attorney, Agent, or Firm* — Cantor Colburn LLP

(57) ABSTRACT

A seat base assembly for a wheelchair includes a dock configured to be mounted to a vehicle frame. An attenuating mechanism is operatively connected to the dock to absorb impact between the vehicle frame and a wheelchair. An interface assembly is operatively connected to the attenuating mechanism to connect a wheelchair to the attenuating mechanism. A crashworthy wheelchair includes a seat having arm rests and a seat back extending therefrom. Front wheels and back wheels are operatively connected to the seat. Each arm rest includes a downward opening slot configured to accommodate a respective one of the back wheels during a negative G event. The wheelchair can include a hook extending down ward from the seat to engage with a respective mating portion of the seat base assembly.

18 Claims, 4 Drawing Sheets

(58) Field of Classification Search
CPC .......... A61G 2220/145; A61G 2220/16; B64D 9/00; B64D 9/003
USPC ...... 410/7, 30, 23, 3, 19, 12, 4, 100, 20, 87, 410/80, 77; 414/921, 373, 462, 480, 537, 414/541
See application file for complete search history.

(56) References Cited

U.S. PATENT DOCUMENTS

| | | | |
|---|---|---|---|
| 4,664,584 A | | 5/1987 | Braun et al. |
| 5,125,598 A | | 6/1992 | Fox |
| 5,344,265 A | | 9/1994 | Ullman et al. |
| 5,669,620 A | | 9/1997 | Robbins |
| 5,884,929 A | * | 3/1999 | Kincaid ................ A61G 3/06 280/250.1 |
| 6,929,226 B1 | | 8/2005 | Philistine |
| 7,083,230 B2 | | 8/2006 | Kull et al. |
| 8,152,101 B2 | * | 4/2012 | Law ................ B64D 11/06 244/118.5 |
| 9,114,049 B2 | * | 8/2015 | Callahan ................ A61G 3/02 |
| 2002/0125711 A1 | | 9/2002 | Calhoun |
| 2003/0197413 A1 | * | 10/2003 | Walker ................ B60N 2/002 297/452.19 |
| 2005/0019125 A1 | | 1/2005 | Panzarella et al. |
| 2008/0106060 A1 | * | 5/2008 | Knopf ................ A61G 5/02 280/250.1 |
| 2010/0051746 A1 | | 3/2010 | Law |
| 2010/0171284 A1 | | 7/2010 | Parks et al. |
| 2012/0292953 A1 | | 11/2012 | Kunze et al. |
| 2013/0149064 A1 | | 6/2013 | Misikir et al. |
| 2014/0271019 A1 | | 9/2014 | Bell |

OTHER PUBLICATIONS

PCT International Search Report and Written Opinion dated Dec. 9, 2016 issued during the prosecution of PCT International Patent Application No. PCT/US2016/037808 (10 pages).
European Search Report for European Application No. 16812409.7; Report dated Apr. 10, 2019 (pp. 1-11).

* cited by examiner

CRASHWORTHY WHEELCHAIR ASSEMBLIES

CROSS REFERENCE TO RELATED APPLICATIONS

This application is the U.S. National Stage of PCT International Patent Application No. PCT/2016/037808 filed Jun. 16, 2016, which claims the benefit of U.S. Provisional Application No. 62/182,248, filed Jun. 19, 2015. The entire disclosure of each application is hereby incorporated herein by reference in its entirety.

BACKGROUND OF THE INVENTION

1. Field of the Invention

The present disclosure relates to wheelchairs, and more particularly to crashworthy wheelchair assemblies for use in aircraft.

2. Description of Related Art

There are a variety of wheelchairs known for everyday use. When a wheelchair is used in an aircraft, for example a rotorcraft, additional safety concerns, such as crashworthiness, should be considered. Existing crashworthiness components, such as energy attenuation, are typically within the aircraft seat itself. Incorporating traditional energy attenuation into a wheelchair seat can tend to make the chair bulky, heavy and difficult to use.

Such conventional methods and systems have generally been considered satisfactory for their intended purpose. However, there is still a need in the art for systems and methods that allow for improved wheelchairs and assemblies therefor. The present invention provides a solution for these needs.

SUMMARY OF THE INVENTION

A seat base assembly for a wheelchair includes a dock configured to be mounted to a vehicle frame, e.g. an airframe. An attenuating mechanism is operatively connected to the dock to absorb impact between the vehicle frame and a wheelchair. An interface assembly is operatively connected to the attenuating mechanism to connect a wheelchair to the attenuating mechanism.

In some embodiments, the dock includes a ramp to facilitate a wheel chair being rolled onto the dock. The dock can be operatively connected to a mount through a spindle. In an unlocked position, the dock can be configured to rotate relative to the mount to accommodate engagement of a wheelchair from different directions. The dock can include a foot pedal extending therefrom to release the dock from a locked position.

It is contemplated that the attenuating mechanism can include a pair of opposing pillars that extend in an upward direction from a rear side of the dock. The interface assembly can include a cross-tie extending between the pair of opposing pillars to connect each pillar to the interface assembly. The cross-tie can include a hook configured to engage with a portion of a wheelchair to secure the wheelchair to the interface assembly. The cross-tie can include a handle operatively connected to the hook on the cross-tie to release the hook from engagement with a wheelchair. The interface assembly can include a platform extending outward from the cross-tie, wherein the platform includes a hook configured to engage with a portion of a wheelchair to secure the wheelchair to the interface assembly. The handle can be operatively connected to the hook on the platform to release the hook from engagement with a wheelchair.

Each pillar can include a respective longitudinal slot, each slot having a respective energy attenuating device. The cross-tie can be engaged with the longitudinal slot of each pillar to transfer energy from a wheelchair to the energy attenuating device. The interface assembly can be engaged with the longitudinal slot of each pillar for accommodating relative motion between the interface assembly and the attenuating mechanism.

A crashworthy wheelchair includes a seat having arm rests and a seat back extending therefrom. Front wheels and back wheels are operatively connected to the seat. Each arm rest includes a downward opening slot configured to accommodate a respective one of the back wheels during a negative G event. The wheelchair can include a hook extending downward from the seat to engage with a respective mating portion of a seat base assembly.

A crashworthy wheelchair assembly includes a wheelchair and a seat base assembly. The seat base assembly includes a dock, an attenuating mechanism and an interface assembly as described above. The wheelchair can include arm rests, front wheels and back wheels, as described above. The wheelchair can include a hook can extending therefrom engaged with a respective mating portion of the interface assembly in a docked position to lock the wheelchair to the seat base assembly. The interface assembly can include a hook extending therefrom engaged with a respective mating portion of the wheelchair in a docked position to lock the wheelchair to the seat base assembly. The attenuating mechanism can include pillars, as described above, wherein each pillar can include an arcuate surface that abuts a respective wheel of the wheelchair in a docked position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
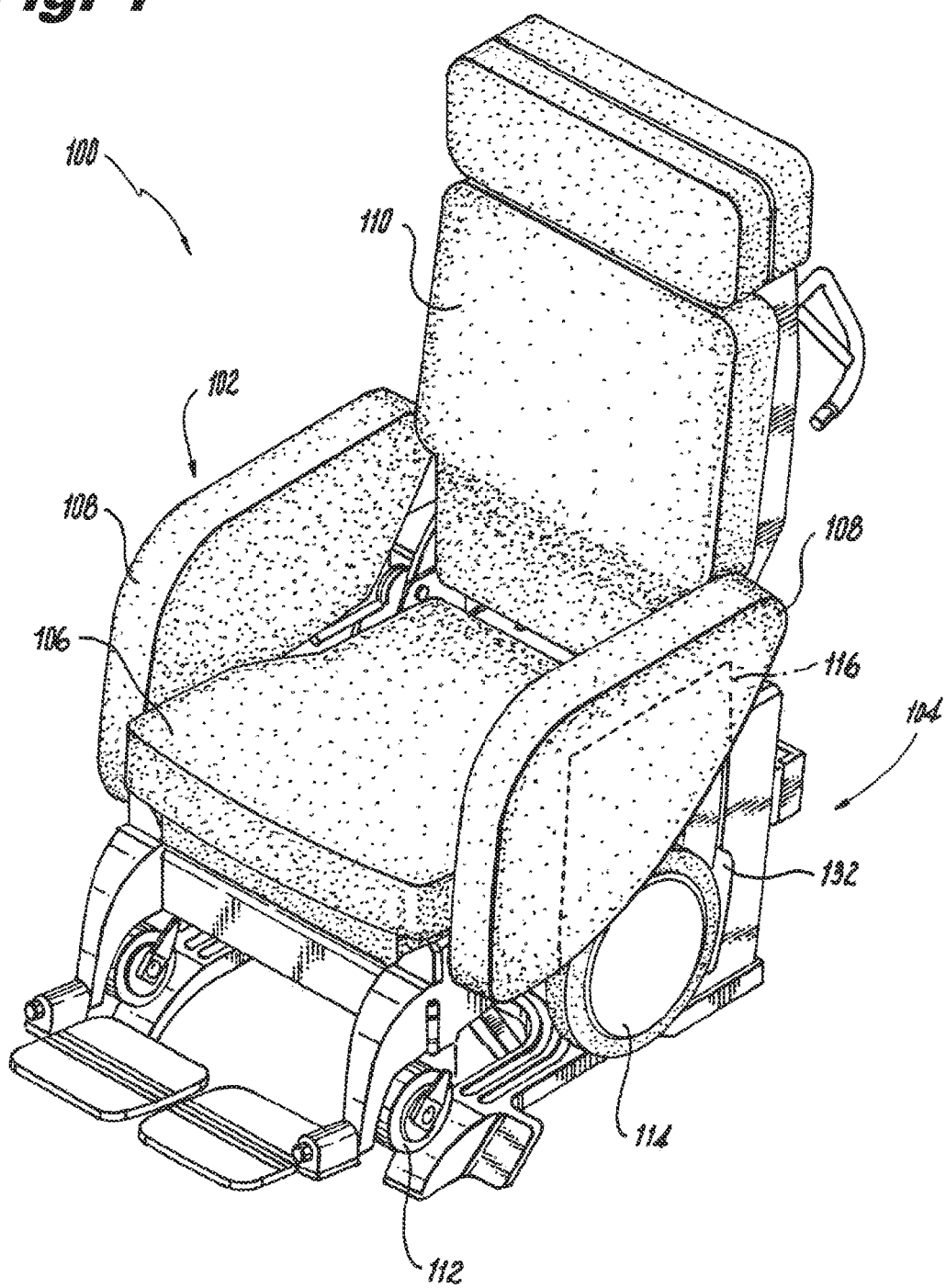
FIG. 1 is a perspective view of an exemplary embodiment of crashworthy wheelchair assembly constructed in accordance with the present disclosure, showing a wheelchair and a seat base assembly.

Reference will now be made to the drawings wherein like reference numerals identify similar structural features or aspects of the subject disclosure. For purposes of explanation and illustration, and not limitation, a perspective view of an exemplary embodiment of a crashworthy wheelchair assembly constructed in accordance with the present disclosure is shown in FIG. 1 and is designated generally by reference character 100. Other embodiments of the crashworthy wheelchair assembly constructed in accordance with the present disclosure, or aspects thereof, are provided in FIGS. 2-4, as will be described.

As shown in FIG. 1, an embodiment of a crashworthy wheelchair assembly 100 includes a wheelchair 102 and a seat base assembly 104. Wheelchair 102 includes a seat 106 having arm rests 108 and a seat back 110 extending therefrom. Front wheels 112 and back wheels 114 are operatively connected to seat 106. Each arm rest 108 includes a downward opening slot 116 configured to accommodate a respective back wheel 114 during a negative G event.

Figure 2:
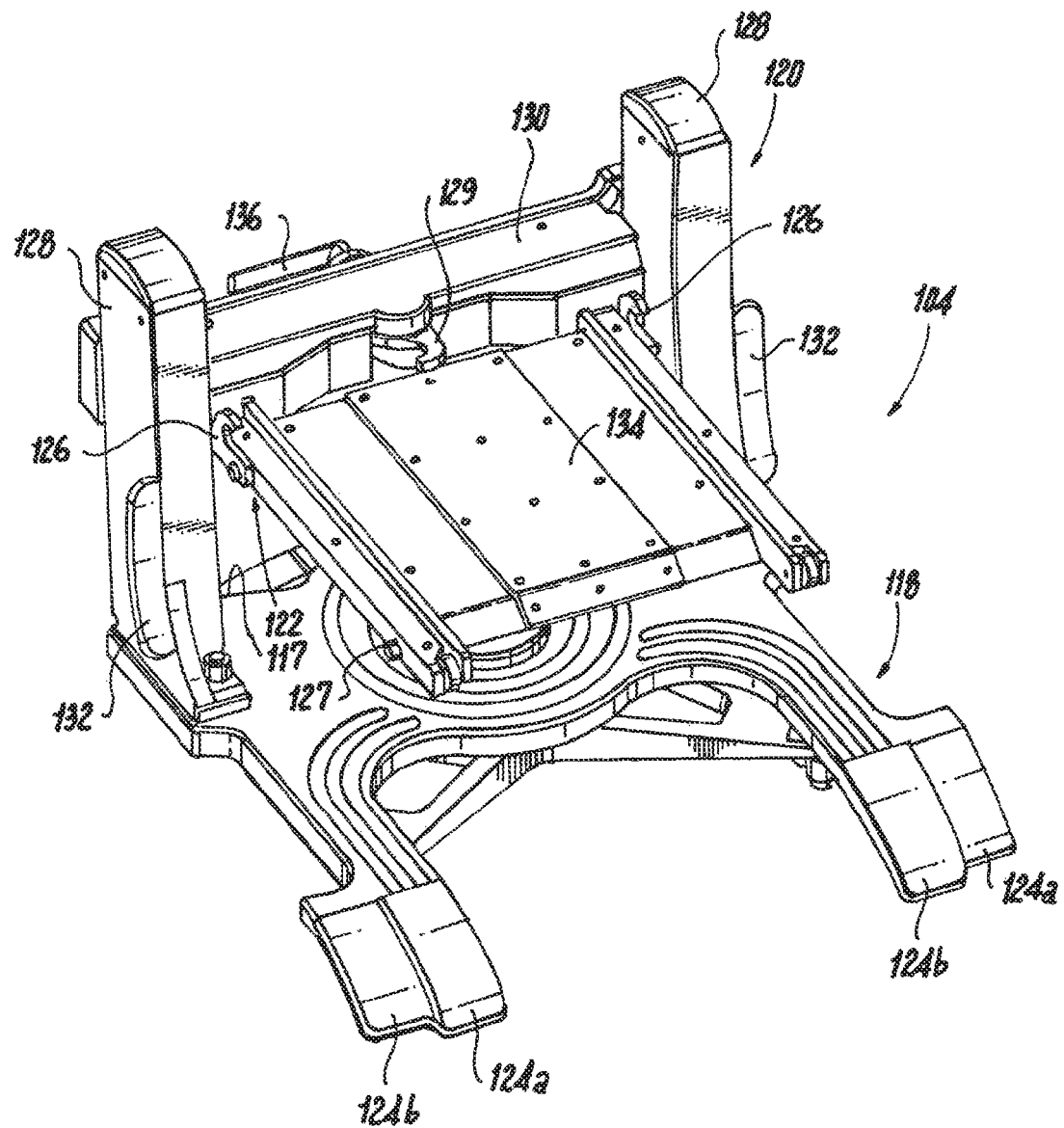
FIG. 2 is a perspective view of the seat base assembly of FIG. 1 from a forward side, showing a dock, an attenuating mechanism, and an interface assembly.

With reference now to FIG. 2, an embodiment of a seat base assembly 104 includes a dock 118 configured to be mounted to a vehicle frame, e.g. an airframe, and configured to be moved between a locked and unlocked position. An attenuating mechanism 120 is operatively connected to dock 118 to absorb impact between the airframe and wheelchair 102. An interface assembly 122 is operatively connected to attenuating mechanism 120 to connect wheelchair 102 to attenuating mechanism 120. Dock 118 includes ramps 124a and 124b to facilitate wheelchair 102 being rolled onto dock 118. By including attenuating mechanism 120 in the seat base assembly 104, instead of wheelchair 102, wheelchair 102 can be lightweight and simple while still being able to be removably mounted to the base assembly. This ensures that a user can remain seated in one chair when transferring between ground and air vehicles, saving embarrassment and hassle for the user. Embodiments of crashworthy wheelchair assembly 100 are fully compliant with Federal Aviation Regulation (FAR) 29.562 (Emergency Landing Dynamic Conditions).

Figure 4:
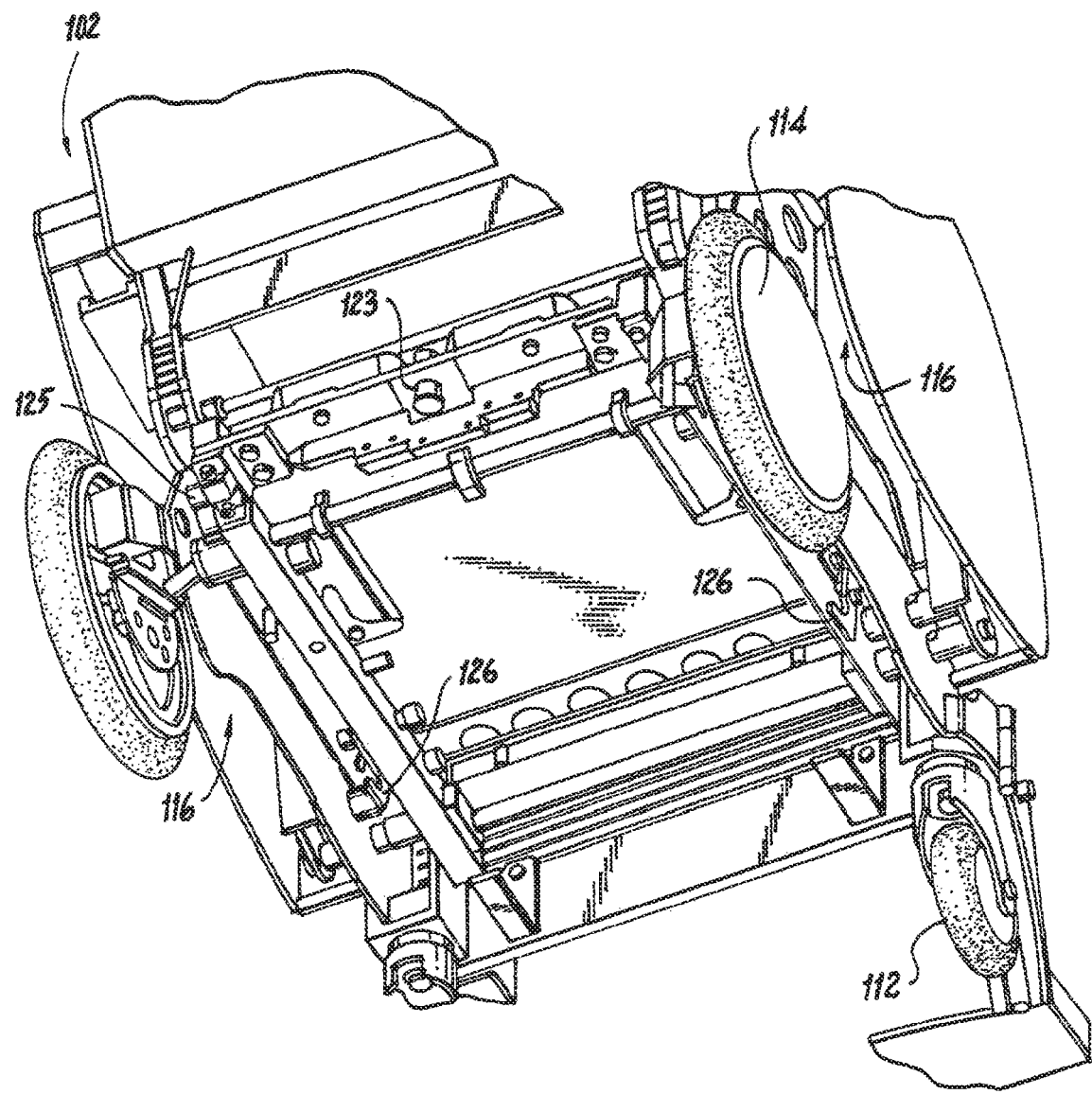
FIG. 4 is a perspective view of the wheelchair of FIG. 1 from an under side, showing hooks and downward opening slots in the arm rests.

With continued reference to FIG. 2, attenuating mechanism 120 includes a pair of opposing pillars 128 that extend in an upward direction from a rear side 117 of dock 118. Interface assembly 122 includes a cross-tie 130 extending between pillars 128 to connect each pillar 128 to interface assembly 122. Each pillar 128 includes an arcuate surface 132 that abuts a respective rear wheel 114 of wheelchair 102 in a docked position, as shown in FIG. 1. Interface assembly 122 includes a platform 134 extending outward from cross-tie 130. Platform 134 includes a pair of hooks 126 configured to engage with a mating portion 125 of wheelchair 102 to secure wheelchair 102 to interface assembly 122. Hooks 126 on platform 134 are fixed, however, it is contemplated that they could also rotate and release similar to hook 129, described below. When docked, mating portions 125 of wheelchair 102, shown in FIG. 4, are engaged with hooks 126 of platform 134 to lock wheelchair 102 to seat base assembly 104. Cross-tie 130 includes a hook 129 configured to engage with another mating portion 123 of wheelchair 102, shown in FIG. 4, to secure wheelchair 102 to interface assembly 122.

Figure 3:
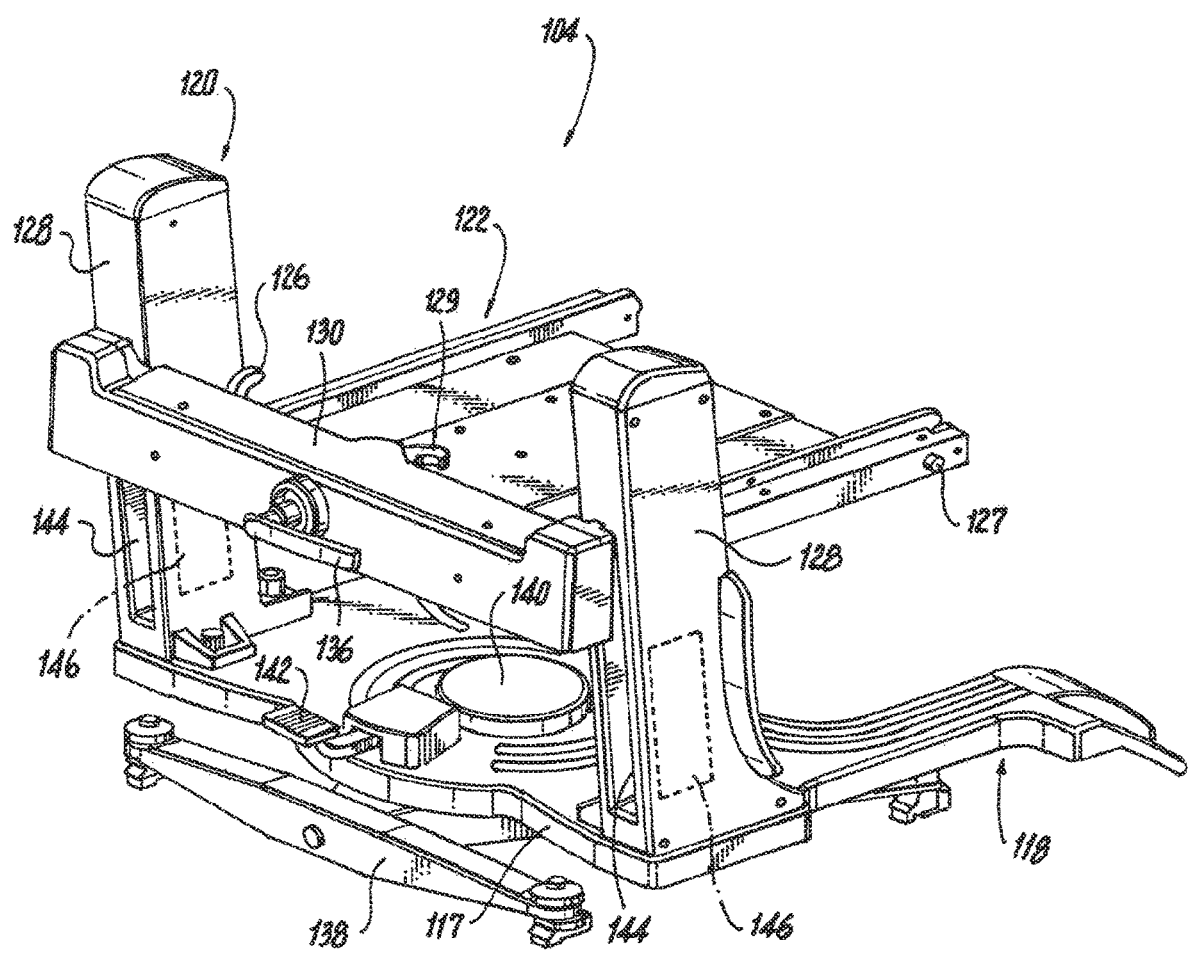
FIG. 3 is a perspective view of the seat base assembly of FIG. 1 from a rear side, showing a handle and a foot pedal.

As shown in FIG. 3, cross-tie 130 includes a handle 136 operatively connected to hook 129 on cross-tie 130. When turned, handle 136 is configured to rotate and release hook 129 from engagement with wheelchair 102, thereby disengaging mating portion 123 and releasing wheelchair 102 from dock 118. It is contemplated that handle 136 can be a 1-step turn-handle. Dock 118 is operatively connected to a mount 138 through a spindle 140. Mount 138 can interface with an existing standard seat track located in the aircraft. In a locked position, dock 118 is forward facing with respect to mount 138, as shown in FIGS. 2 and 3. In an unlocked position, dock 118 is configured to rotate relative to mount 138 to accommodate engagement of wheelchair 102 from different directions. Dock 118 includes a foot pedal 142 extending therefrom for releasing dock 118 from a locked position into an unlocked position and allowing it to swivel with respect to mount 138 for easy docking of wheelchair 102. Once foot pedal 142 is released, and dock 118 is rotated back into a forward facing position, dock 118 locks back into place within mount 138 in a forward facing position.

With continued reference to FIG. 3, each pillar 128 includes a respective longitudinal slot 144. Each slot 144 includes a respective energy attenuating device 146, for example, a strap bending device using a series of calibrated rollers. Interface assembly 122 is engaged with longitudinal slot 144 of each pillar 128 through cross-tie 130. Longitudinal slots 144 accommodate relative motion between interface assembly 122 and attenuating mechanism 120 during a negative G event. Cross-tie 130 is attached within the longitudinal slot of each pillar 128 to transfer energy from wheelchair 102 to energy attenuating device 146.

During a negative G event, the negative G forces are transferred to energy attenuating device 146 and interface assembly 122 strokes downward within slots 144, along with any wheelchair, e.g. wheelchair 102, locked thereto. Downward opening slots 116 of arm rests 108 accommodate the nesting of back wheels 114 as the seat 106 and arm rests 108 of wheelchair 102 move downward. Those skilled in the art will readily appreciate that because energy attenuating devices 146 are located in pillars 128, as opposed to seat 106, seat base assembly 104 can interface with a variety of other personal transport mechanisms, such as stretchers, and the like, while still providing similar attenuation during negative G events.

As shown in FIG. 4, wheelchair 102 also includes hooks 126 extending therefrom. Hooks 126 extending from wheelchair 102 are similar to hooks 126 that extend from platform 134. Hooks 126 of wheelchair 102 are configured to engage with respective mating portions 127, e.g. pins, of interface assembly 122 (as shown in FIGS. 2 and 3) in a docked position to lock wheelchair 102 to seat base assembly 104. Wheelchair 102 also includes mating portions 125 configured to engage with hooks 126 on platform 134, as described above. Those skilled in the art will readily appreciate that while the fastening mechanisms between wheelchair 102 and interface assembly 122 are shown and described herein as hooks 126 and 129, and mating portions 123, 125 and 127, there are a variety of suitable mechanisms for releasably attaching wheelchair 102 to interface assembly 122, for example, latches, clasps, carabiners, and the like.

The methods and systems of the present disclosure, as described above and shown in the drawings, provide for a wheelchair assemblies with superior properties including improved durability, increased ease of use and increased ease of manufacturing. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A seat base assembly for a wheelchair comprising:
    a dock configured to be mounted to a vehicle frame;
    an attenuating mechanism operatively connected to the dock to absorb impact between the vehicle frame and a wheelchair; and an interface assembly operatively connected to the attenuating mechanism to connect a wheelchair to the attenuating mechanism, wherein the dock includes a ramp for receiving the wheelchair.

2. A seat base assembly as recited in claim 1, wherein the dock is operatively connected to a mount through a spindle, wherein in an unlocked position, the dock is configured to rotate relative to the mount to accommodate engagement of a wheelchair from different directions.

3. A seat base assembly as recited in claim 1, wherein the dock includes a foot pedal extending therefrom to release the dock from a locked position.

4. A seat base assembly as recited in claim 1, wherein the attenuating mechanism includes a pair of opposing pillars that extend in an upward direction from a rear side of the dock, and wherein the interface assembly includes a cross-tie extending between the pair of opposing pillars to connect each pillar to the interface assembly.

5. A seat base assembly as recited in claim 4, wherein the cross-tie includes a hook configured to engage with a portion of a wheelchair to secure the wheelchair to the interface assembly.

6. A seat base assembly as recited in claim 5, wherein the cross-tie includes a handle operatively connected to the hook on the cross-tie to release the hook from engagement with a wheelchair.

7. A seat base assembly as recited in claim 4, wherein the interface assembly includes a platform extending outward from the cross-tie, wherein the platform includes a hook configured to engage with a portion of a wheelchair to secure the wheelchair to the interface assembly.

8. A seat base assembly as recited in claim 7, wherein the cross-tie includes a handle operatively connected to the hook on the platform to release the hook from engagement with a wheelchair.

9. A seat base assembly as recited in claim 4, wherein each pillar includes a respective longitudinal slot, each slot having a respective energy attenuating device.

10. A seat base assembly as recited in claim 9, wherein the cross-tie is engaged with the longitudinal slot of each pillar to transfer energy from a wheelchair to the energy attenuating device.

11. A seat base assembly as recited in claim 9, wherein the interface assembly is engaged with the longitudinal slot of each pillar for accommodating relative motion between the interface assembly and the attenuating mechanism.

12. A crashworthy wheelchair comprising:
a seat having arm rests and a seat back extending therefrom; and
front wheels and back wheels operatively connected to the seat, wherein each arm rest includes a downward opening slot configured to accommodate a respective one of the back wheels during a negative G event.

13. A crashworthy wheelchair as recited in claim 12, further comprising a hook extending downward from the seat to engage with a respective mating portion of a seat base assembly.

14. A crashworthy wheelchair assembly comprising:
a wheelchair; and a seat base assembly including:
a dock configured to be mounted to an airframe; an attenuating mechanism operatively connected to the dock to absorb impact between the airframe and the wheelchair; and
an interface assembly operatively connected between the wheelchair and the attenuating mechanism to transfer energy to the attenuating mechanism, wherein the dock includes a ramp for receiving the wheelchair.

15. A crashworthy wheelchair assembly as recited in claim 14, wherein the wheelchair includes arm rests, front wheels and back wheels, wherein each arm rest includes a downward opening slot configured to accommodate a respective one of the back wheels during a negative G event.

16. A crashworthy wheelchair assembly as recited in claim 14, wherein the wheelchair includes a hook extending therefrom engaged with a respective mating portion of the interface assembly in a docked position to lock the wheelchair to the seat base assembly.

17. A crashworthy wheelchair assembly as recited in claim 14, wherein the interface assembly includes a hook extending therefrom engaged with a respective mating portion of the wheelchair in a docked position to lock the wheelchair to the seat base assembly.

18. A crashworthy wheelchair assembly as recited in claim 14, wherein the attenuating mechanism includes a pair of opposing pillars that extend in an upward direction from a rear side of the dock, wherein each pillar includes an arcuate surface that abuts a respective wheel of the wheelchair in a docked position.

* * * * *